United States Patent
Cheong et al.

(10) Patent No.: US 12,313,145 B2
(45) Date of Patent: May 27, 2025

(54) DRIVE BELTS INCLUDING FOAMED UNDERCORD LAYERS AND METHODS OF MANUFACTURING THE SAME

(71) Applicant: Gates Corporation, Denver, CO (US)

(72) Inventors: Tae Hee Cheong, Troy, MI (US); Thomas S. Moss, III, Denver, CO (US); Charles F. Ochoa, Columbia, MO (US); Douglas G. Gerring, Denver, CO (US); Kyle Spring, Denver, CO (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 18/270,007

(22) PCT Filed: Dec. 28, 2021

(86) PCT No.: PCT/US2021/065316
§ 371 (c)(1),
(2) Date: Jun. 28, 2023

(87) PCT Pub. No.: WO2022/146988
PCT Pub. Date: Jul. 7, 2022

(65) Prior Publication Data
US 2024/0077129 A1 Mar. 7, 2024

Related U.S. Application Data

(60) Provisional application No. 63/131,209, filed on Dec. 28, 2020.

(51) Int. Cl.
*F16G 1/08* (2006.01)
*B29D 29/08* (2006.01)
(Continued)

(52) U.S. Cl.
CPC ............... *F16G 1/08* (2013.01); *B29D 29/08* (2013.01); *B32B 5/18* (2013.01); *B32B 25/02* (2013.01);
(Continued)

(58) Field of Classification Search
CPC ..... F16G 1/08; F16G 1/28; F16G 5/06; F16G 5/20; B29D 29/08; B32B 5/18;
(Continued)

(56) References Cited

U.S. PATENT DOCUMENTS

| | | | | |
|---|---|---|---|---|
| 5,486,133 A | * | 1/1996 | Russell | B26D 1/035 |
| | | | | 156/142 |
| 7,988,577 B2 | * | 8/2011 | Omori | F16G 5/20 |
| | | | | 474/263 |

(Continued)

FOREIGN PATENT DOCUMENTS

WO WO-2016170788 A1 * 10/2016 ............. B82Y 30/00

OTHER PUBLICATIONS

Commissioner for Patents, International Search Report, International Application No. PCT/US2021/065316, Mailing date: May 16, 2022.

*Primary Examiner* — Henry Y Liu
(74) *Attorney, Agent, or Firm* — Kevin J. Aiken, Esq.

(57) ABSTRACT

A drive belt includes a foamed undercord layer having void spaces located throughout the foamed undercord layer. The void spaces extend from a backing layer of the undercord layer to an exterior surface of the backing layer, and may include some void spaces at the exterior surface that are open to the external environment. The foamed undercord layer may exhibit a 20% reduction in specific gravity as compared to an unfoamed version of the undercord layer. The manufacturing process for making the foamed undercord layer can include incorporating foaming agent in the (Continued)

undercord layer such that the undercord layer both foams and cures when heat and pressure are applied to the undercord layer. The foamed drive belt incorporating the foamed undercord layer may exhibit reduced bending stiffness and improved energy efficiency.

26 Claims, 5 Drawing Sheets

(51) Int. Cl.
*B29K 21/00* (2006.01)
*B29K 105/04* (2006.01)
*B29K 105/12* (2006.01)
*B32B 5/18* (2006.01)
*B32B 25/02* (2006.01)
*B32B 25/04* (2006.01)
*F16G 1/28* (2006.01)
*F16G 5/06* (2006.01)
*F16G 5/20* (2006.01)

(52) U.S. Cl.
CPC .............. *B32B 25/045* (2013.01); *F16G 1/28* (2013.01); *B29K 2021/00* (2013.01); *B29K 2105/04* (2013.01); *B29K 2105/12* (2013.01); *B32B 2250/02* (2013.01); *B32B 2250/24* (2013.01); *B32B 2413/00* (2013.01); *F16G 5/06* (2013.01); *F16G 5/20* (2013.01)

(58) Field of Classification Search
CPC ... B32B 25/02; B32B 25/045; B32B 2250/02; B32B 2250/24; B32B 2413/00; B29K 2021/00; B29K 2105/04; B29K 2105/12
USPC .................................................. 474/205, 238
See application file for complete search history.

(56) References Cited

U.S. PATENT DOCUMENTS

| 2004/0204275 | A1* | 10/2004 | Burrowes | C08L 21/00 474/263 |
| 2013/0153123 | A1* | 6/2013 | Pasch | B29C 43/46 156/138 |
| 2014/0190622 | A1* | 7/2014 | Knox | B29C 43/48 156/179 |
| 2017/0130014 | A1 | 5/2017 | Anyaogu et al. | |

* cited by examiner

DRIVE BELTS INCLUDING FOAMED UNDERCORD LAYERS AND METHODS OF MANUFACTURING THE SAME

TECHNICAL FIELD

The present application relates to belts for use in, for example, automobile power transmissions, and more specifically, belts having improved efficiency in terms of reduced energy required to turn the belt as compared to previously known belts. The belts described herein incorporate foamed undercord layers in order to reduce the bending stiffness of the belts and thereby improve the energy efficiency of the belt. The improved bending stiffness exhibited by belts including foamed undercord layers as described herein is accomplished without sacrificing other performance characteristics of the belt, such as durability and power transmission capability.

BACKGROUND

Previously known belts used in, for example, automobile power transmissions, require a certain amount of energy in order to turn the belt. The energy consumption is typically in the form of hysteretic heat generation and additional fuel consumption from increased torque to turn the belt. Belts requiring lower amounts of energy to turn the belt are desirable for a variety of reasons. For example, a belt requiring less energy to turn results in improved fuel economy and reduced emissions, both of which are highly valued in vehicle design.

The energy efficiency of a belt (i.e., the amount of energy required to turn a belt) depends on numerous different characteristics of the belt, including, but not limited to, the materials used in the belt, the mass of the belt, the thickness of the belt, and the bending stiffness of the belt. In the case of bending stiffness, various aspects of a belt can be altered in order to decrease bending stiffness and thereby decrease the energy consumption required to turn the belt. However, changes made to a belt in order to decrease bending stiffness must be considered in conjunction with how the changes may negatively impact other characteristics of the belt, such as durability. As such, a need exists for belts that require less energy to turn the belt while also not degrading other important characteristics of the belt, such as those relating to performance and durability. A need also exists for methods of manufacturing such belts.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, a drive belt having reduced bending stiffness to thereby improve energy efficiency includes a foamed undercord layer. The foamed undercord layer has a thickness extending from a backing layer surface to an exterior surface opposite the backing layer surface. The undercord layer is foamed throughout the entire thickness of the undercord layer. Because the undercord layer is foamed, it includes a plurality of void spaces located throughout the thickness of the undercord layer. Some of the void spaces at the exterior surface of the undercord layer may be open to the external environment. In some embodiments, the undercord layer further includes chopped fibers. In some embodiments, the exterior surface of the undercord layer is in the form of a plurality of ridges, which may be oriented either parallel or perpendicular to the axis of rotation of the drive belt.

In some embodiments, a method of manufacturing a drive belt having reduced bending stiffness to thereby improve energy efficiency includes preparing a sheet of uncrosslinked undercord material, the sheet of uncrosslinked undercord material including an elastomer and a foaming agent; applying the sheet of uncrosslinked undercord material to a cylindrical mandrel; applying heat and pressure to the sheet of uncrosslinked undercord to thereby cure and foam the sheet of undercord material and form a sleeve of undercord material, the foaming resulting in the creation of a plurality of void spaces throughout the thickness of the undercord material; removing the sleeve of undercord material from the cylindrical mandrel; cutting the sleeve of undercord material into individual belts; and grinding or cutting an exterior surface of the individual belts to form a plurality of ridges in the individual belts, the grinding or cutting resulting in some of the plurality of void spaces at an exterior surface of the individual belts being open to the exterior environment.

These and other aspects of the high efficiency belt described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed high efficiency belt, including the preferred embodiment, are described with reference to the following figures, wherein like reference numerals refer to like parts throughout the various views unless otherwise specified.

FIG. 1A is an expanded simplified cross-sectional view of a portion of the drive belt shown in FIG. 1.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
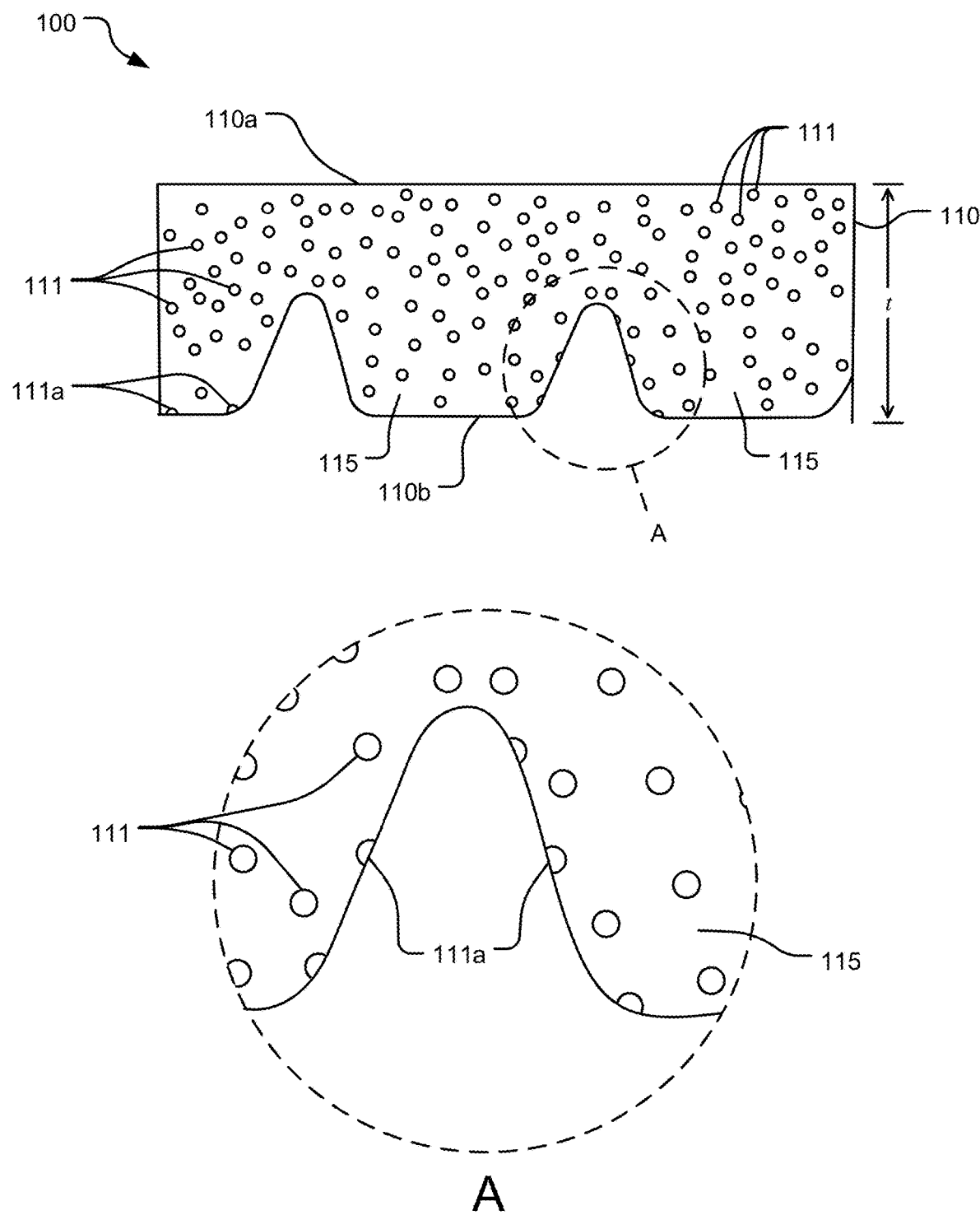
FIG. 1 is a simplified cross sectional view of a drive belt in accordance with various embodiments described herein.

With respect to FIG. 1 and FIG. 1A, a cross-sectional view of a drive belt 100 including a foamed undercord layer 110 in accordance with various embodiments of the drive belt described herein is shown. FIG. 1A provides an expanded view of the portion of the undercord layer 110 in circle A shown in FIG. 1. The foamed undercord layer 110 has a backing layer surface 110a and an exterior surface 110b opposite the backing layer surface 110a, with the thickness t of undercord layer 110 being the distance between the backing layer surface 110a and the exterior surface 110b. The thickness t of the undercord layer 110 is generally not limited, and may be adjusted depending on, e.g., the specific application in which the drive belt 100 will be used. In some embodiments, the thickness of the undercord layer 110 may be in the range of from 2.0 to 4.5 mm. As used herein, the term "exterior surface" refers to a surface that will serve as the contact surface of the belt, i.e., a surface that will engage with pulleys or the like. In some embodiments, such engagement is direct engagement (i.e., the exterior surface directly contacts the pulleys) or indirect engagement (i.e., a cover layer or the like is disposed between the external surface of the undercord layer and the pulley).

The exterior surface 110b of the undercord layer 110 as shown in FIG. 1 and FIG. 1A has been ground or cut to form a plurality of ridges 115 on the exterior surface side of the drive belt 100. In some embodiments, the cutting of the exterior surface 110b to form ridges 115 means that the drive belt 100 may be considered a profiled drive belt. Other names for drive belts formed by cutting or grinding to form ridges include ground belt or fly-cut belt. While FIG. 1 and FIG. 1A show the formation of ridges 115 in the exterior surface 110b of the undercord layer 110, it should be appreciated that other embodiments of the drive belt described herein may not include ridges 115, in which case the exterior surface 110b may instead have a generally planar shape.

The undercord layer 110 is a foamed undercord layer 110, meaning the foamed undercord layer 110 includes a plurality of void spaces 111 within the body of the undercord layer 110. As shown in FIG. 1 and FIG. 1A, the void spaces 111 are located throughout the undercord layer 110, including at the backing layer surface 110a and at the exterior surface 110b. The sizes and shapes of the plurality of void spaces 111 are generally not limited and may be uniform or non-uniform throughout the undercord layer 110. The amount of void spaces present in the undercord layer can be measured based on the percentage decrease in the specific gravity of the undercord layer from an unfoamed (i.e., generally solid with no void spaces) undercord layer. In some embodiments, the foamed undercord layer 110 has a 10 to 40% reduction in specific gravity from an unfoamed undercord layer due to the amount of void space provided in the foamed undercord layer via the plurality of void spaces 111. In one embodiment, the reduction in specific gravity is from about 10% to about 25%, such as about 15% to 25% or about 20%. In other embodiments, the reduction in specific gravity may be up to 30%, 35% or 40%. In some embodiments, the specific gravity for the foamed undercord layer is in the range of from about 0.6 to about 1.1 g/cm$^3$, such as from about 0.7 to about 1.1 g/cm$^3$ or from about 0.8 to about 1.0 g/cm$^3$.

In some embodiments, the reduction in specific gravity generally contributes to the drive belt 100 described herein having a reduced bending stiffness. For example, in some embodiments, an unfoamed undercord layer contributes to providing a drive belt having a bending stiffness of about 46 N/mm at 1 Hz and about 50 N/mm at 10 Hz, whereas a foamed undercord layer having a reduction in specific gravity of about 19% contributes to providing a drive belt having a bending stiffness of about 35 N/mm at 1 Hz and about 40 N/mm at 10 Hz. Relatedly, a foamed undercord layer having a reduction in specific gravity of about 25% contributes to providing a drive belt having a bending stiffness of about 38 N/mm at 1 Hz and about 42 N/mm at 10 Hz. Furthermore, a foamed undercord layer having a reduction in specific gravity of about 43% contributes to providing a drive belt having a bending stiffness of about 31 N/mm at 1 Hz and about 34 N/mm at 10 Hz. Generally speaking, this data shows a downward trend in bending stiffness as specific gravity is increased. While there is a slight increase in bending stiffness between 19% specific gravity and 25% specific gravity, this is believed to be due to normal and expected test variations and does not detract from the overall general downward trend in bending stiffness as specific gravity increases.

As shown most clearly in FIG. 1A, some of the void spaces 111 present at the exterior surface 110b of the undercord layer 110 are open to the external environment (labeled in FIG. 1A as void spaces 111a). In other words, these void spaces 111a are not fully enclosed by the material of the undercord layer 110, but instead are open to the external environment. In some embodiments, these void spaces 111a that are at least partially open to the external environment are formed as a result of the cutting or grinding used to form ridges 115 as described previously. For example, when such cutting or grinding passes through a void space 111, the void space below the cut or grind remains a part of the undercord layer 110, but is now open to the external environment where the material of the undercord layer forming the top boundary of the void space was cut away. In some embodiments, this cutting or grinding to expose to the external environment some of the void spaces creates an exterior surface 110b with a plurality of divots or "potholes". In some embodiments, the exterior surface 110b is not covered by a cover layer or the like, but instead remains the exterior contact surface of the drive belt 100 in its final form. In such embodiments, the exterior contact surface 110b of the final form of the drive belt 100 has the divoted or potholed characteristic described previously.

In some embodiments, the undercord layer 110 is foamed using a chemical foaming agent to create the void spaces 111 within the undercord layer 110 when heat and/or pressure are applied to the stock material of the undercord layer 110 during manufacturing. When heated, the chemical foaming agents decompose to form a gas that then creates void spaces in the material of the undercord layer 110. Because of this foaming mechanism, the material of the undercord layer 110 directly abuts the void spaces and serves as the immediate boundary of the void spaces 111. This is in contrast to, for example, hollow microspheres, which when included in an undercord layer, provide a barrier between the void space and the material of the undercord layer 110, the barrier being the material of the hollow microsphere.

In some embodiments, the undercord layer 110 is comprised primarily of an elastomer material. Any elastomer material suitable for use in a drive belt can be used. Non-limiting examples of the elastomer material include EPDM, chloroprene rubber, SBR, and ethylene-butene, ethylene propylene, or ethylene octene copolymers, as well as TPE, TPU, or TPV elastomers. The elastomer material may also be a blend of two or more elastomers. As noted previously, the initial stock material used in the formation of the foamed undercord layer includes a foaming agent, but the foaming agent decomposes to a gas as part of the foaming process. Additional description of the foaming of the undercord layer and suitable foaming agents is provided below with respect to the discussion of FIG. 5.

In addition to the elastomer material that forms the base material of the undercord layer 110, the undercord layer 110 may further include chopped fibers, such as chopped cotton fiber. The inclusion of chopped fibers dispersed throughout the undercord layer 110 may improve certain performance characteristics of the drive belt 110, such as coefficient of friction and MAN. However, inclusion of chopped fibers can also reduce durability, so the amount of chopped fiber included in the undercord layer 110 should generally be controlled. In some embodiments, the chopped fiber is provided in the undercord layer in an amount ranging from 3 to 40 phr (parts per hundred rubber).

Figure 2:
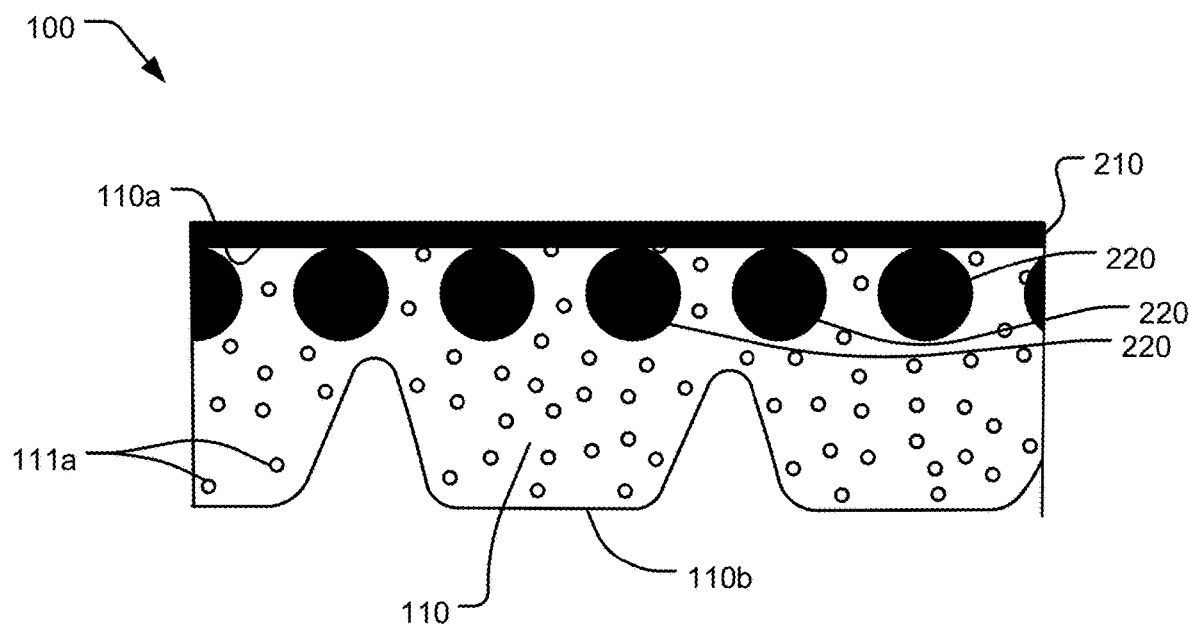
FIG. 2 is a simplified cross-sectional view of a drive belt in accordance with various embodiments described herein.

With reference to FIG. 2, the drive belt 100 may include additional components to improve performance of the drive belt 100. In some embodiments, the drive belt 100 further includes a backing layer 210, which abuts the backing layer surface 110a of the undercord layer 110. Any backing layer material suitable for use in a drive belt can be used for the backing layer 210. Similarly, the thickness of the backing layer 210 is not limited and may be adjusted based on the desired thickness for the backing layer of the resulting belt. In some embodiments, the backing layer 210 is made from a rubber material. In some embodiments, the backing layer 210 may include one or more of a textile, adhesion rubber, or the like.

FIG. 2 also illustrates the inclusion of cords 220 within the undercord layer 110. Cords 220 are generally aligned perpendicular to the axis of rotation of the belt, regardless of the orientation of ridges that may be formed in the exterior surface 110b of the undercord layer 110. The material of the cords 220 included within the undercord layer 110 is generally not limited, and in some embodiments, may include metal, aramid, carbon fiber, nylon, polyester, glass, ceramic and various composite materials, and may include hybrid mixtures of materials. The dimensions of the cord (e.g., diameter) as well as spacing between adjacent lengths of cord are not limited and may be selected based on the desired final application of the belt.

Figure 3A:
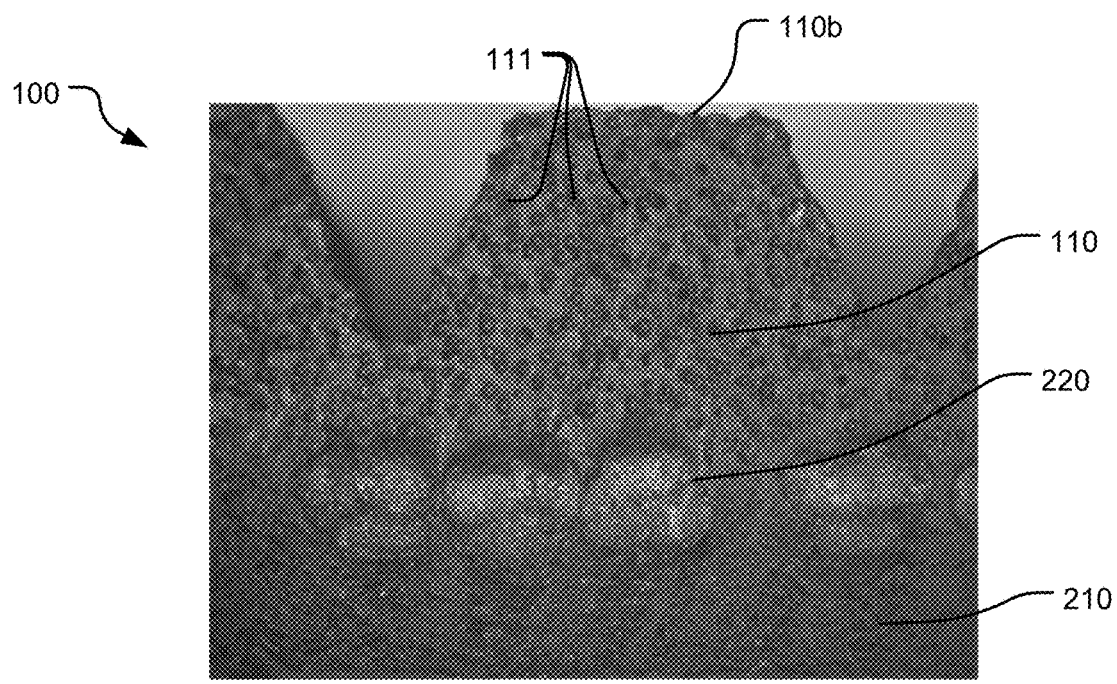
FIG. 3A and FIG. 3B are a Keyence microscopic image and SEM image, respectively, of a cross-section of a drive belt in accordance with various embodiments described herein.
Figure 3B:
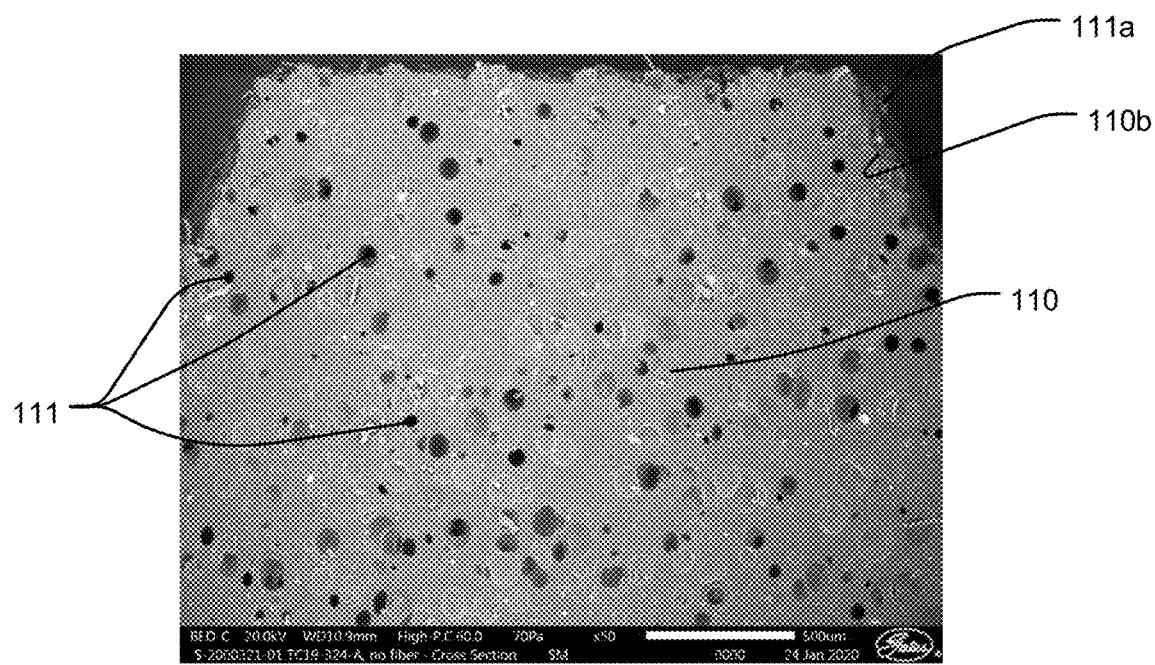

FIGS. 3A and 3B are a Keyence microscopic image and SEM image (50x), respectively, of a cross-section of a drive belt 100 constructed in accordance with various embodiments described herein. In the Keyence image of FIG. 3A, the drive belt 100 is shown including an undercord layer 110, backing layer 210 and cords 220. The drive belt 100 shown in FIG. 3A also includes ridges 115 formed from cutting or grinding the exterior surface 110b of the undercord layer. As shown in FIG. 3A, void spaces 111 are formed throughout the thickness of the undercord layer, including void spaces formed all the way to the exterior surface 110b such that some void spaces 111a at the exterior surface 110b are open to the external environment. In the SEM (50x) image of FIG. 3B, the void spaces 111 are shown as being located throughout the undercord layer 110, including all the way to the exterior surface 110b seen in the upper right hand corner of the SEM image. Void spaces 111a at the exterior surface 110b are open to the external environment. As also shown in both FIGS. 3A and 3B, the void spaces 111 directly abut the base material of the undercord layer 110 such that there is no material boundary between the base material of the undercord layer 110 and the void spaces 111.

Figure 4A:
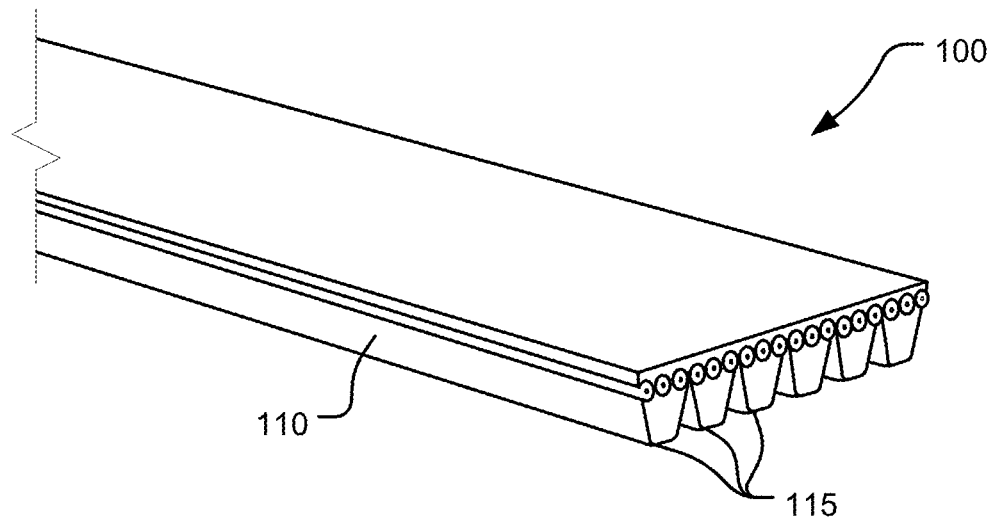
FIGS. 4A and 4B are perspective view of drive belts in accordance with various embodiments described herein.
Figure 4B:
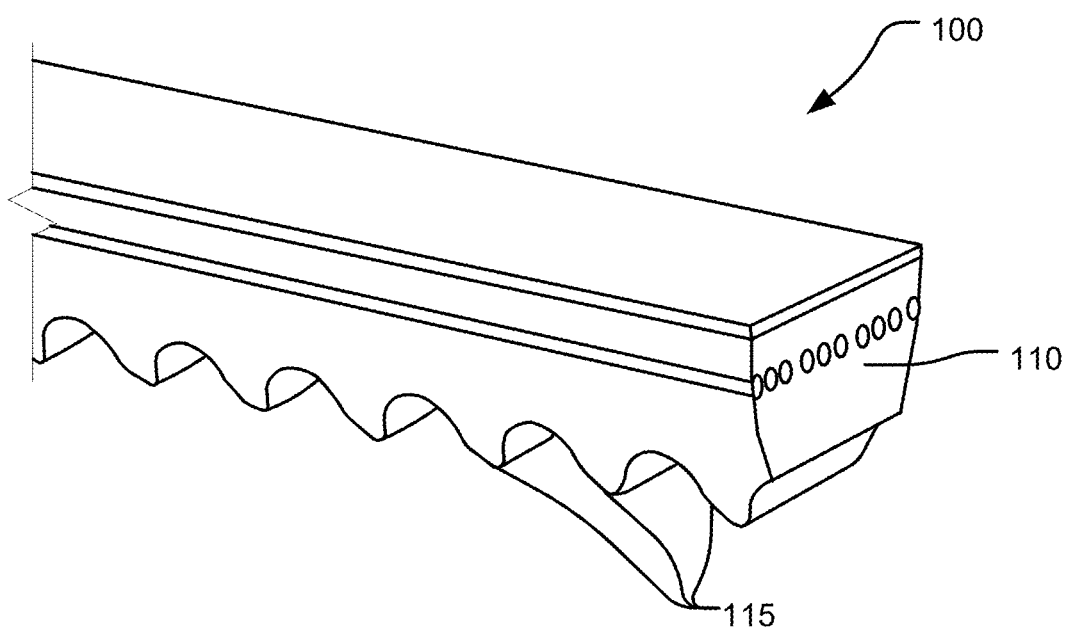

FIG. 4A and FIG. 4B are perspective views of drive belts 100 having different ridge orientations and which can incorporate the foamed undercord layer 110 described herein. In FIG. 4A, the ridges 115 are generally oriented in a direction perpendicular to the axis of rotation of the belt 100. These ridges 115 can also be considered to be aligned in parallel with the length direction of the belts 100. In FIG. 4B, the ridges 115 are generally oriented in a direction parallel to the axis of rotation of the belt 100 (or perpendicular to the length direction of the drive belt 100). The undercord layer 110 can be incorporated into a drive belt having either ridge orientation shown in FIGS. 4A and 4B, and can also be incorporated into other types of drive belt, such as drive belts that do not include any type of ridges.

Figure 5:
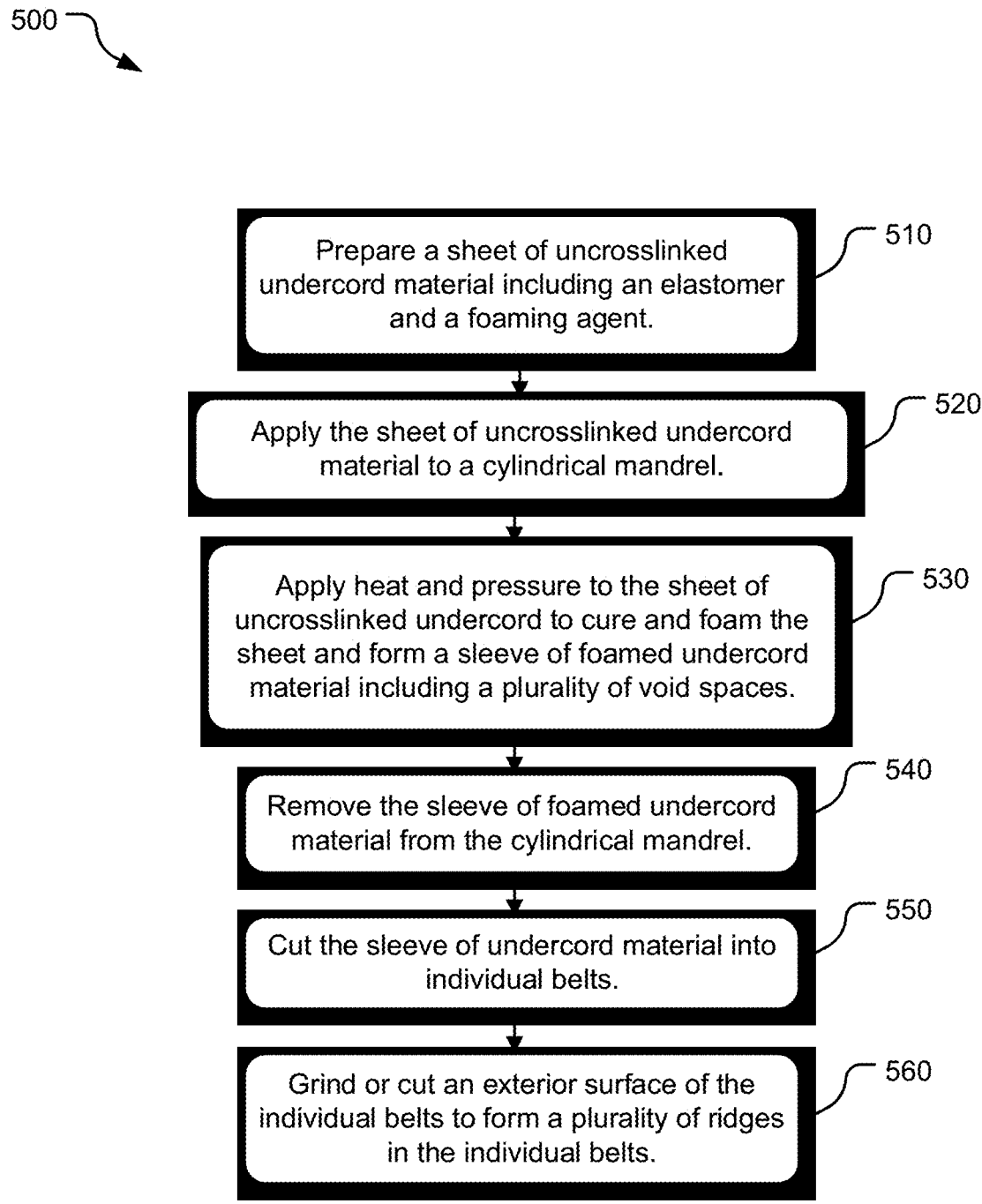
FIG. 5 is a flow chart illustrating a method for manufacturing a drive belt in accordance with various embodiments described herein.

With reference to FIG. 5, a flow chart illustrating an embodiment of a method 500 for manufacturing a drive belt is shown. The method 500 generally includes a step 510 of preparing a sheet of uncrosslinked undercord material; a step 520 of applying the sheet of uncrosslinked undercord material to a cylindrical mandrel; a step 530 of applying heat and pressure to the sheet of uncrosslinked undercord material to cure and foam the undercord material and form a sleeve of undercord materials; a step 540 of removing the sleeve of undercord material from the mandrel; a step 550 of cutting the sleeve of undercord material into individual belts; and a step 560 of grinding or cutting an exterior surface of the individual belts to form a plurality of ridges in the individual belts.

With respect to step 510, a sheet of uncrosslinked undercord material is prepared using known methods for forming sheets of undercord material. The sheet of uncrosslinked undercord material comprises at least one elastomer and a foaming agent. As described previously, the elastomer material may be, for example, EPDM, SBR or other types of rubbers, and the uncrosslinked undercord material may include one or more elastomers. The elastomer forms the majority of the sheet of the undercord material, and other components included in the sheet will generally be provided at a PHR (parts per hundred rubber) level.

In addition to the elastomer component, the sheet of undercord material further includes a foaming agent. The foaming agent is included in the sheet of undercord material so that when heat and pressure are applied to the sheet as described in step 530 below, the foaming agent decomposes into a gas, thereby forming void spaces within the sheet of undercord material. In some embodiments, the foaming agent incorporated into the sheet of undercord material is a foaming agent that decomposes at a temperature similar to the temperature at which the sheet of undercord material is cured. The foaming of the sheet of undercord material is improved when the decomposition of the foaming agent occurs at a similar temperature to the curing of the sheet of undercord material. Therefore, in some embodiments, the foaming agent is a foaming agent having a decomposition temperature in the range of from about 125 to 175 deg. C., and more specifically at a decomposition temperature of about 150 deg. C., which are temperatures generally in line with curing temperatures. Exemplary though non-limiting examples of foaming agent that can be included in the sheet of uncrosslinked undercord material include Unicell G™ (manufactured by Dongjin Semichem Co., Ltd.) and Celogen OT™ (manufactured by CelChem LLC).

The amount of foaming agent included in the sheet of unfoamed undercord material is generally selected such that the foamed and cured undercord material experiences a reduction in specific gravity of about 20% as compared to the specific gravity of the unfoamed undercord material. In some embodiments, foaming agent provided at an amount of from about 2 to 10 phr, such as from 2.5 to 5 phr, achieves the desired reduction in specific gravity.

Other components can also optionally be included in the sheet of uncrosslinked undercord layer. In some embodiments, the sheet of undercord material further includes a curing agent, such as a peroxide. In some embodiments, a lower temperature peroxide is preferred as the curing agent, as the lower temperature peroxide enhances foaming in addition to promoting crosslinking. More specifically, the lower temperature peroxide promotes curing at lower temperatures, which helps keep and lock into the undercord material the void spaces formed from the decomposition of the foaming agent. In some embodiments, DiCup is a suitable lower temperature peroxide for use in the uncrosslinked undercord sheet, DiCup having a lower curing temperature than, for example, VulCup peroxide curing agent. Sulfur curing agents can also be used, as the curing temperature of sulfur curing agents often matches well with decomposition temperatures of foaming agents. The amount of low temperature peroxide included in the uncrosslinked undercord sheet can be, for example, from 5 to 10 phr, such as about 8 phr.

Another component which may be included in the sheet of uncrosslinked undercord material is chopped fiber. As discussed previously, chopped fiber can be included in the undercord layer to improve certain performance characteristics of the drive belt (e.g., coefficient of friction and MAN), but the amount of chopped fiber included should be controlled since too much chopped fiber can undesirably lower the durability of the drive belt. Any suitable chopped fiber can be used, with one suitable example being chopped cotton fiber. In some embodiments, chopped fiber is included in the sheet of uncrosslinked undercord material an amount of from about 3 to 40 phr.

In step 520, the sheet of uncrosslinked undercord material is applied to a cylindrical mandrel. The sheet may be wrapped around the cylindrical mandrel one time or multiple times to create layers of the sheet surrounding the mandrel. The cylindrical mandrel generally has a planar surface and a diameter that is approximately the desired diameter of the drive belt being formed via method 500. In some embodiments, the backing layer surface is the layer disposed directly against the mandrel when applying the sheet to the mandrel. The planar surface of the mandrel ensures that this backing layer surface will also be generally flat.

While not discussed in detail herein, the step 520 of applying the sheet of uncrosslinked undercord layer to the mandrel can include additional sub-steps when the belt being formed in method 500 incudes additional components such as a backing layer and internal cords. For example, when the belt includes a backing layer, the backing layer may be applied to the mandrel before applying the sheet of undercord material. Similarly, cord material embedded within the final belt product can be wound around the mandrel at any appropriate time, such as after the backing layer has been applied to the mandrel but before applying the sheet of undercord material to the mandrel, or after a first layer of undercord material is applied to the mandrel but before a second sheet of undercord material is applied to the mandrel.

Once the sheet of undercord material is applied to the mandrel in step 520, step 530 generally includes applying heat and/or pressure to the sheet applied to the mandrel. The application of heat and pressure is designed to both cure the uncrosslinked material and decompose the foaming agent so as to foam the undercord material. The curing and foaming can occur generally concurrently during step 530. As discussed previously, the foaming agent included in the sheet of material can be specifically selected so as to have a decomposition temperature that is similar to the temperature used for the curing step so that the curing and foaming occurs generally concurrently. While any suitable combination of temperature and pressure can be selected provided it leads to curing and foaming, in some embodiments, the sheet of material applied to the mandrel is subjected to temperatures in the range of from about 150 deg. C. to 200 deg. C.

As noted above, step 530 results in both curing and foaming of the undercord material applied to the mandrel. With respect to the foaming, the foaming agent decomposes into a gas to thereby form a plurality of void spaces within the undercord material. In some embodiments, the sheet of undercord material is prepared such that the foaming agent is located throughout the sheet so that when foaming occurs, void spaces are formed throughout the entirety of the sheet of undercord material, and more specifically from the backing layer surface to the exterior surface.

As a result of step 530, the uncrosslinked undercord material is converted to a sleeve of cured and foamed undercord material. The sleeve of undercord material has sufficient structural integrity that it can be removed from the mandrel in step 540 while retaining the cylindrical form of the mandrel. Once removed, the sleeve of undercord material is cut along its axial length in step 550 to form a plurality of individual belts. The number of individual belts formed from the sleeve may generally depend on the overall length of the sleeve and the desired width of the individual belts.

In step 560, the exterior surface of the individual belts are cut or ground to form a profiled belt having a plurality of ridges in the exterior surface. With reference back to FIGS. 4A and 4B, the specific manner of cutting or grinding the exterior surface to form ridges is generally not limited, and may include forming ridges that are either perpendicular or parallel to the axis of rotation of the belt. The specific dimensions of the ridges formed in the exterior surface of the belt are also generally not limited and may be varied based on the specific application of the belt being formed.

When grinding or cutting to form ridges in step 560, the cutting or grinding will generally cut through some of the void spaces in the undercord layer such that some of the void spaces closest to the exterior layer after cutting or grinding are open to the external environment. In this manner, the exterior surface may have a divoted or potholed surface texture as a result of the void spaces at the exterior surface that are open to the external environment. In some embodiments, the profiled belt formed by method 500 will not include any type of cover layer on the exterior surface such that the void spaces at the exterior surface remain open to the external environment in the final product form.

In the method 500 described previously, the ridges are formed in the radial outer surface of the belt. Prior to use, the belt may be inverted so that the ridged surface faces radially inwardly and is thus suitable for use as a drive belt in various power transmission and other applications.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A drive belt comprising:
   a foamed undercord layer having a thickness extending from a backing layer surface to an exterior surface opposite the backing layer surface, wherein the foamed undercord layer is foamed throughout the entire thickness of the foamed undercord layer;

a plurality of void spaces located throughout the thickness of the foamed undercord layer, the plurality of voids being present throughout the thickness of the foamed undercord layer as a result of the foamed undercord layer being foamed; and a plurality of cords fully embedded within the foamed undercord layer.

2. The drive belt of claim 1, wherein at least some of the void spaces present at the exterior surface are open to an external environment.

3. The drive belt of claim 1, wherein the exterior surface of the foamed undercord layer is in the shape of a plurality of ridges.

4. The drive belt of claim 3, wherein the plurality of ridges are aligned in parallel to the axis of rotation of the drive belt.

5. The drive belt of claim 3, wherein the plurality of ridges are aligned perpendicular to the axis of rotation of the drive belt.

6. The drive belt of claim 1, further comprising chopped fibers dispersed within the foamed undercord layer.

7. The drive belt of claim 1, wherein the material of the foamed undercord layer directly abuts the plurality of void spaces.

8. The drive belt of claim 1, further comprising:
a backing layer, the backing layer abutting the backing layer surface of the foamed undercord layer;
and the plurality of cords being aligned perpendicular to the axis of rotation of the drive belt.

9. The drive belt of claim 1, wherein the foamed undercord layer comprises an elastomer.

10. The drive belt of claim 1, wherein the specific gravity of the foamed undercord layer is in the range of from 0.6 to 1.1 g/cm3.

11. The drive belt of claim 10, wherein the specific gravity of the foamed undercord layer is in the range of from 0.8 to 1.0 g/cm3.

12. The drive belt of claim 1, wherein the drive belt is a profiled drive belt.

13. The drive belt of claim 1, wherein the specific gravity of the foamed undercord layer is reduced by 10 to 40% as compared to an unfoamed undercord layer, and the bending stiffness of the drive belt decreases as the reduction in specific gravity of the foamed undercord layer is increased.

14. The drive belt of claim 13, wherein the drive belt has a bending stiffness of between 31 and 38 N/mm at 1 Hz and a bending stiffness of between 34 and 42 N/mm at 10 Hz.

15. A method of manufacturing a drive belt, comprising:
preparing a sheet of uncrosslinked undercord material, the sheet of uncrosslinked undercord material comprising an elastomer and a foaming agent;
applying the sheet of uncrosslinked undercord material to a cylindrical mandrel in at least two layers;
placing cord material in the mold between said at least two layers so that the cord will be embedded within the undercord material in the final belt;
applying heat and pressure to the sheet of uncrosslinked undercord material to thereby cure and foam the sheet of undercord material and form a sleeve of undercord material, the foaming resulting in the creation of a plurality of void spaces throughout the thickness of the sleeve of undercord material;
removing the sleeve of undercord material from the cylindrical mandrel;
cutting the sleeve of undercord material into individual belts;
and grinding or cutting an exterior surface of the individual belts to form a plurality of ridges in the individual belts, the grinding or cutting resulting in some of the plurality of void spaces at an exterior surface of the individual belts being open to the exterior environment.

16. The method of claim 15, wherein the foaming agent has a decomposition temperature in the range of from 125 deg. C. and 175 deg. C.

17. The method of claim 15, wherein the sheet of uncrosslinked undercord layer comprises foaming agent at an amount of about 2.5 phr.

18. The method of claim 15, wherein the sheet of uncrosslinked undercord material further comprises a curing agent.

19. The method of claim 18, wherein the curing agent is a low-temperature peroxide.

20. The method of claim 15, wherein the sheet of uncrosslinked undercord material further comprises chopped fibers.

21. The method of claim 20, wherein the chopped fiber is provided in the sheet of uncrosslinked undercord material at a range of from about 3 to about 40 phr.

22. The method of claim 15, wherein the sleeve of undercord material has a specific gravity in the range of from 0.6 to 1.1 g/cm3.

23. The method of claim 22, wherein the sleeve of undercord material has a specific gravity in the range of from 0.8 to 1.0 g/cm3.

24. The method of claim 15, wherein grinding or cutting the exterior surface of the individual belts to form a plurality of ridges in the individual belts comprises forming the plurality of ridges such that the ridges are aligned perpendicular to the axis of rotation of the individual belts.

25. The method of claim 15, wherein grinding or cutting the exterior surface of the individual belts to form a plurality of ridges in the individual belts comprises forming the plurality of ridges such that the ridges are aligned parallel to the axis of rotation of the individual belts.

26. The method of claim 15, wherein the elastomer directly abuts the plurality of void spaces.

* * * * *